(12) United States Patent
Salter et al.

(10) Patent No.: US 10,501,007 B2
(45) Date of Patent: Dec. 10, 2019

(54) FUEL PORT ILLUMINATION DEVICE

(71) Applicant: Ford Global Technologies, LLC, Dearborn, MI (US)

(72) Inventors: Stuart C. Salter, White Lake, MI (US); Paul Kenneth Dellock, Northville, MI (US); James J. Surman, Clinton Township, MI (US); Balbir S. Grewal, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 191 days.

(21) Appl. No.: 15/672,975

(22) Filed: Aug. 9, 2017

(65) Prior Publication Data

US 2017/0361761 A1 Dec. 21, 2017

Related U.S. Application Data

(63) Continuation-in-part of application No. 15/019,458, filed on Feb. 9, 2016, now Pat. No. 9,855,799, and a
(Continued)

(51) Int. Cl.
*B60Q 1/26* (2006.01)
*B60Q 1/00* (2006.01)
(Continued)

(52) U.S. Cl.
CPC ............ *B60Q 1/2661* (2013.01); *B60K 15/00* (2013.01); *B60K 15/04* (2013.01); *B60K 15/05* (2013.01); *B60Q 1/0017* (2013.01); *B60Q 1/50* (2013.01); *F21S 43/13* (2018.01); *F21S 43/14* (2018.01); *F21S 43/16* (2018.01); *F21S 43/241* (2018.01); *F21S 43/243* (2018.01); *F21S 43/249* (2018.01); *B60K 2015/03217* (2013.01); *B60K 2015/0553* (2013.01); *B60Y 2400/92* (2013.01)

(58) Field of Classification Search
CPC ...... B60Q 1/2661; F21S 43/249; F21S 43/13; F21S 43/14; F21S 43/16; F21S 43/243; F21S 43/241; B60K 15/00; B60K 15/04; B60K 15/05; B60K 15/0017; B60K 15/50
USPC ....................................................... 362/509
See application file for complete search history.

(56) References Cited

U.S. PATENT DOCUMENTS 2,486,859 A 11/1949 Meijer et al.
4,244,210 A 1/1981 Prohaska et al.
(Continued)

FOREIGN PATENT DOCUMENTS

CN 101337492 A 1/2009
CN 201169230 Y 2/2009
(Continued)

*Primary Examiner* — Bryon T Gyllstrom
(74) *Attorney, Agent, or Firm* — Vichit Chea; Price Heneveld LLP

(57) ABSTRACT

An indicator disposed proximate a fuel port of the vehicle is disclosed. The indicator comprises a persistent luminescent layer, a first light source, and one or more circuits. The persistent luminescent layer is configured to emit a first color of light. The first light source is configured to emit a charging emission to charge the persistent luminescent layer. The one or more circuits are configured to selectively activate one or more portions of the first light source such that the persistent luminescent layer is charged and illuminates the indicator in the first color.

18 Claims, 7 Drawing Sheets

Related U.S. Application Data continuation-in-part of application No. 14/993,637, filed on Jan. 12, 2016.

(51) Int. Cl.
  *B60K 15/04* (2006.01)
  *B60Q 1/50* (2006.01)
  *F21S 43/13* (2018.01)
  *F21S 43/14* (2018.01)
  *F21S 43/249* (2018.01)
  *B60K 15/00* (2006.01)
  *F21S 43/16* (2018.01)
  *F21S 43/243* (2018.01)
  *F21S 43/241* (2018.01)
  *B60K 15/05* (2006.01)
  *B60K 15/03* (2006.01)

(56) References Cited

U.S. PATENT DOCUMENTS

| | | | |
|---|---|---|---|
| 4,532,578 A * | 7/1985 | Gaden | B60Q 1/2607 362/365 |
| 5,053,930 A | 10/1991 | Benavides | |
| 5,434,013 A * | 7/1995 | Fernandez | B44C 5/00 428/690 |
| 5,709,453 A | 1/1998 | Krent et al. | |
| 5,757,111 A * | 5/1998 | Sato | F21S 8/035 313/111 |
| 5,839,718 A | 11/1998 | Hase et al. | |
| 6,031,511 A | 2/2000 | DeLuca et al. | |
| 6,117,362 A | 9/2000 | Yen et al. | |
| 6,192,612 B1 | 2/2001 | Maier et al. | |
| 6,294,990 B1 | 9/2001 | Knoll et al. | |
| 6,364,498 B1 | 4/2002 | Burbank | |
| 6,375,864 B1 | 4/2002 | Phillips et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,739,844 B1 | 5/2004 | Yu et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,347,576 B2 | 3/2008 | Wang et al. | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,118,441 B2 | 2/2012 | Hessling | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,317,329 B2 | 11/2012 | Seder et al. | |
| 8,317,359 B2 | 11/2012 | Harbers et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,459,832 B2 | 6/2013 | Kim | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,653,553 B2 | 2/2014 | Yamazaki et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,905,610 B2 | 12/2014 | Coleman et al. | |
| 8,952,341 B2 | 2/2015 | Kingsley et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,059,378 B2 | 6/2015 | Verger et al. | |
| 9,065,447 B2 | 6/2015 | Buttolo et al. | |
| 9,067,530 B2 | 6/2015 | Bayersdorfer et al. | |
| 9,187,034 B2 | 11/2015 | Tarahomi et al. | |
| 9,299,887 B2 | 3/2016 | Lowenthal et al. | |
| 9,315,148 B2 | 4/2016 | Schwenke et al. | |
| 9,452,709 B2 | 9/2016 | Aburto Crespo | |
| 9,568,659 B2 | 2/2017 | Verger et al. | |
| 9,616,812 B2 | 4/2017 | Sawayanagi | |
| 10,240,542 B1 * | 3/2019 | Salter | F02D 41/042 |
| 2001/0053082 A1 * | 12/2001 | Chipalkatti | B60Q 1/26 362/496 |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2004/0066644 A1 | 4/2004 | Chang | |
| 2004/0213088 A1 | 10/2004 | Fuwausa | |
| 2005/0073851 A1 * | 4/2005 | Itoh | B32B 17/10036 362/487 |
| 2005/0084229 A1 | 4/2005 | Babbitt et al. | |
| 2005/0189795 A1 | 9/2005 | Roessler | |
| 2006/0087826 A1 | 4/2006 | Anderson, Jr. | |
| 2006/0097121 A1 | 5/2006 | Fugate | |
| 2006/0104074 A1 * | 5/2006 | Boniface | B60Q 1/2661 362/496 |
| 2007/0032319 A1 | 2/2007 | Tufte | |
| 2007/0139923 A1 * | 6/2007 | Negley | F21S 8/02 362/253 |
| 2007/0284169 A1 | 12/2007 | Zabiega | |
| 2007/0285938 A1 | 12/2007 | Palmer et al. | |
| 2007/0297045 A1 | 12/2007 | Sakai et al. | |
| 2008/0205075 A1 | 8/2008 | Hikmet et al. | |
| 2009/0126827 A1 | 5/2009 | Guendouz et al. | |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |

(56) References Cited

U.S. PATENT DOCUMENTS

| | | |
|---|---|---|
| 2010/0102736 A1 | 4/2010 | Hessling |
| 2010/0246198 A1* | 9/2010 | Hook .................. B60Q 1/2661 362/459 |
| 2011/0012062 A1 | 1/2011 | Agrawal et al. |
| 2011/0095232 A1 | 4/2011 | Mahany |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0188779 A1 | 7/2012 | Schultz et al. |
| 2012/0233895 A1* | 9/2012 | Martin .................. C09K 11/02 40/542 |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0278402 A1* | 10/2013 | Rothschild .............. B60Q 1/50 340/425.5 |
| 2013/0335994 A1* | 12/2013 | Mulder .................. F21V 9/00 362/555 |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0204128 A1 | 7/2014 | Jiang |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0187169 A1 | 6/2016 | Gil Paredes |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0253179 A1* | 9/2017 | Kumada .................. B60Q 3/68 |

FOREIGN PATENT DOCUMENTS

| | | |
|---|---|---|
| CN | 201193011 Y | 2/2009 |
| CN | 204127823 U | 1/2015 |
| CN | 104617629 A | 5/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

\* cited by examiner

FUEL PORT ILLUMINATION DEVICE

CROSS-REFERENCE TO RELATED APPLICATIONS AND CLAIMS TO PRIORITY

This application is a continuation-in-part of and claims priority under 35 U.S.C. § 120 to commonly owned, co-pending, related U.S. patent application Ser. No. 15/019,458, filed Feb. 9, 2016, entitled FUEL LEVEL INDICATOR, and is also a continuation-in-part of and claims priority under 35 U.S.C. § 120 to commonly owned, co-pending, related U.S. patent application Ser. No. 14/993,637, filed Jan. 12, 2016, entitled VEHICLE ILLUMINATION ASSEMBLY, the entire disclosures of which are incorporated herein by reference.

FIELD OF THE INVENTION

The present invention generally relates to a lighting apparatus and more specifically relates to a lighting apparatus for a vehicle.

BACKGROUND OF THE INVENTION

Modern vehicles utilize various systems to improve convenience and ease of use. Some vehicles may utilize various illumination devices to improve vehicle accessibility. The disclosure relates to system sand devices to illuminate portions of vehicles. As described herein, a fuel level or fuel port may correspond to various types of fuel (e.g. electrical charge, gasoline, diesel, hydrogen, etc.) that may be utilized for a vehicle.

SUMMARY OF THE INVENTION

According to one aspect of the present invention, an illumination device for a vehicle fuel port is disclosed. The illumination device comprises a light transmissive panel disposed around at least a portion of the fuel port and a first persistent luminescent portion disposed in an interior cavity of the fuel port. A light source is configured to emit a charging emission into the interior cavity. The light transmissive panel is configured to transmit ambient light from outside the interior cavity to the persistent luminescent layer.

According to another aspect of the present invention, a method for illuminating a vehicle fuel port is disclosed. The method comprises receiving ambient light on an exterior surface of a light transmissive panel of the fuel port and transmitting the ambient light through the light transmissive panel into an interior cavity of the fuel port. The method further comprises charging a persistent luminescent portion disposed in the interior cavity with the ambient light and selectively emitting an excitation emission into the interior cavity charging the persistent luminescent portion.

According to yet another aspect of the present invention, an illumination device for a vehicle fuel port is disclosed. The device comprises a light transmissive panel disposed around at least a portion of the fuel port and a first persistent luminescent portion disposed in an interior cavity of the fuel port. A fuel door is configured to selectively enclose the interior cavity and a light source is configured to emit a charging emission through the light transmissive panel into the interior cavity. The light transmissive panel is configured to transmit ambient light from outside the interior cavity to the persistent luminescent layer.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms first, second, third, etc. as utilized herein may provide designations in reference to the figures for clarity. For example, a first portion and a second portion may be referred to in some implementations and only a second portion may be referred to in some additional implementations. Such designations may serve to demonstrate exemplary arrangements and compositions and should not be considered to designate a specific number of elements or essential components of any specific implementation of the disclosure, unless clearly specified otherwise. These designations, therefore, should be considered to provide clarity in reference to various possible implementations of the disclosure, which may be combined in various combinations and/or individually utilized to clearly reference various elements of the disclosure.

Figure 1:
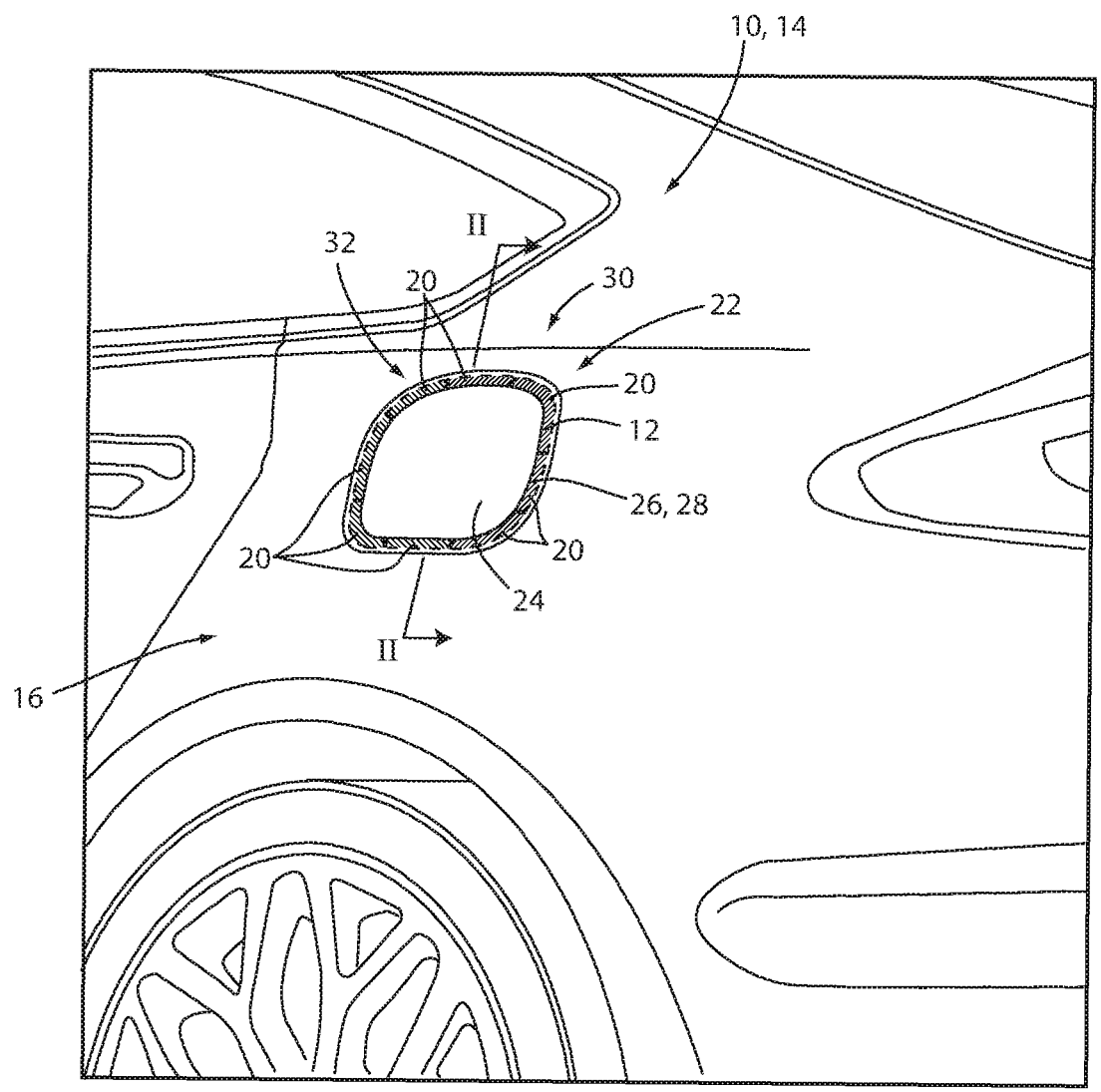
FIG. 1 is a perspective view of an exterior portion of a vehicle demonstrating a level indicator.

Referring to FIG. 1, the following disclosure describes an indication device 10 that may comprise a level indicator 12. The level indicator 12 may be utilized for various applications and may generally be configured to communicate a fuel level. In an exemplary embodiment, the level indicator 12 may be utilized to communicate a fuel level for a vehicle 14. The fuel level may be communicated by the level indicator 12 by illuminating a portion of an exterior portion 16 of the vehicle 14.

The indication device 10 may be in communication with a controller configured to selectively illuminate one or more segments or portions 20 of the level indicator 12. The portions 20 or segments illuminated may represent a fuel level of the vehicle 14. As described herein, a fuel level may correspond to a level of any form of fuel (e.g. electrical charge, gasoline, diesel, hydrogen, etc.) that may be utilized for the vehicle 14. As described herein, the level indicator 12 may be utilized as an illumination apparatus or notification device configured to communicate a fuel level of the vehicle 14.

Figure 2:
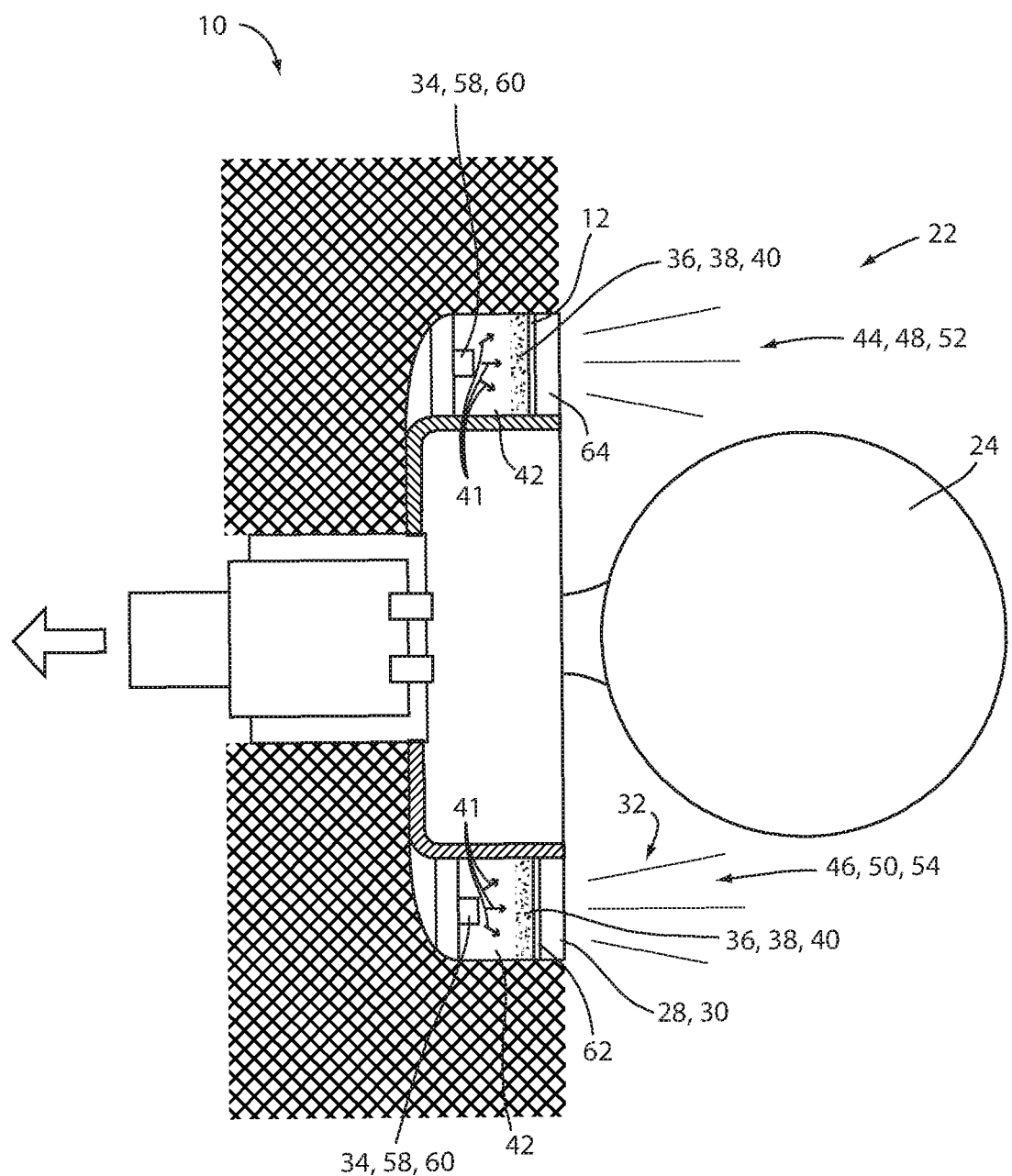
FIG. 2 is a cross-sectional view taken through line II-II of FIG. 1 further illustrating a fuel port comprising a level indicator.

FIG. 2 demonstrates a cross-sectional view of the level indicator 12 along section line II-II. Referring now to FIGS. 1 and 2, the exterior portion 16 of the vehicle 14 may correspond to various surfaces, panels, and/or portions of the vehicle 14. In some implementations, level indicator 12 may be disposed proximate a fuel port 22 of the vehicle 14. The fuel port 22 may comprise a fuel door 24 configured to selectively conceal the fuel port 22. As previously discussed, the fuel port 22 may be configured to receive fuel in various forms, for example liquid, gaseous, plasma, electrical current, etc. In this configuration, the level indicator 12 may provide for a flexible solution that may be used in a variety of applications.

In some embodiments, the level indicator 12 may be configured to at least partially surround the fuel door 24. The level indicator 12 may also be configured to be disposed on the exterior portion 16 of the vehicle 14, which may be remote from the fuel port 22. In an exemplary embodiment, the level indicator 12 may form a ring 26 or trim portion that substantially surrounds the fuel port 22. In various embodiments, the level indicator 12 may be configured to illuminate various portions of an illuminating surface 28. The portions of the illuminating surface may be illuminated in a first color, which may correspond to an accent light 30. Additionally, the illuminating surface 28 may be illuminated in a second color, which may correspond to a fuel level indication 32 of the vehicle 14.

To provide for the functionality of illuminating the level indicator 12 in the first color and/or the second color, the level indicator 12 may comprise an active light source 34 configured to selectively activate an emission of light from at least one passive light source 36. As discussed herein, each of the light sources (e.g. the active light source and the passive light source[s]) may be referred to as a first light source, a second light source, etc. for clarity. The active light source 34 may correspond to one or more light generating devices. The at least one passive light source 36 may correspond to one or more passive light sources (e.g. the first passive light source 38 and the second passive light source 40). The passive light source 36 may be provided as one or more luminescent materials configured to emit light. The active light source 34 may correspond to various forms of light sources that may be driven by electrical current or control signals (e.g. halogen lights, fluorescent lights, light emitting diodes (LEDs), etc.)

In order to communicate the level indication 32 of the vehicle 14, the controller may be in communication with a fuel sensor configured to communicate a fuel level of the vehicle 14. Based on the fuel level, the controller may activate the active light source 34 to selectively illuminate a portion of the level indicator 12. The controller may illuminate a variety of portions or segments of the level indicator 12 to communicate the level indication 32. A resolution of the level indicator 12 or the incremental illumination of various segments may correspond to a number of light sources forming the level indicator 12 and a spacing of the light sources. In this configuration, the controller may selectively illuminate the active light source 34 of the level indicator 12 to communicate a fuel level of the vehicle 14.

Referring now to FIG. 2, in some embodiments, the one or more passive light sources may correspond to a first passive light source 38 and a second passive light source 40. The first passive light source 38 may be illuminated via a first luminescent material. The second passive light source 40 may be illuminated via a second luminescent material. The luminescent materials may be disposed in a carrier layer 42 of the level indicator 12. In this configuration, the luminescent materials may be configured to receive at least one excitation emission 41 of light from the active light source 34. The excitation emission 41 may correspond to a wavelength configured to excite one or more of the luminescent materials of the passive light sources 38 and 40.

In some embodiments, the excitation emission 41 may be supplied by an excitation source of the active light source 34. In an exemplary embodiment, the excitation source may correspond to one or more light producing sources of the active light source 34 and may be configured to emit a blue, near ultra-violet, or ultra-violet light. The excitation emission 41 may correspond to a wavelength configured to excite and illuminate one or more luminescent materials of the first passive light source 38 and/or the second passive light source 40. In this configuration, the passive light sources 38 and 40 may be selectively illuminated by the controller in response to the activation of the excitation source of the active light source 34.

When the active light source 34, the first passive light source 38, and the second passive light source 40 are illuminated, each of the light sources may emit light in one or more colors. The active light source 34 may emit a first output emission 44 in a first color 46. The first passive light source 38 may emit a second output emission 48 in a second color 50. The second passive light source 40 may output a third output emission 52 in a third color 54. When multiple distinct colors or wavelengths of light are output by the active light source 34, the first passive light source 38, and/or the second passive light source 40, the wavelengths of light of each of the output emissions 44, 48, and 52 may mix together and be expressed as a multicolor or combined color of light. Though the active light source 34, the first passive light source 38, and the second passive light source 40 are discussed as being illuminated concurrently, one or more of the output emissions 44, 48, and 52 may be activated independently.

The active light source 34 may correspond to one or more light sources configured to emit the first output emission 44. Additionally, in some embodiments, the active light source 34 may be configured to emit one or more excitation emissions 41. The excitation emission 41 may correspond to one or more wavelengths of light at a first wavelength, which may correspond to an activation emission or charging emission of the first passive light source 38 and/or the second passive light source 40. In various embodiments, the active light source 34 may be configured to selectively illuminate one or more of light producing devices or sources. In this way, the controller may selectively activate an excitation source 58 of the active light source 34 to emit an excitation emission 41 and an output source 60 of the active light source 34 to emit the first output emission 44.

The luminescent materials may correspond to transient or persistent luminescent materials, which may be disposed in the carrier layer 42. The indication device 10 may further comprise an optical waveguide 62 and an emissive portion 64, which may be molded over the light sources 36, 38, and 40. The optical waveguide 62 may be applied to or form at least a portion of the carrier layer 42. The optical waveguide 62 may correspond to a light diffusing fiber, for example a glass or polymeric optical fiber. The optical fiber may be substantially transparent and configured to bend or flex to conform to various shapes or profiles of the panel of the vehicle 14 and/or the fuel port 22. The optical fiber may be configured to emit the output emissions 44, 48, and 52 uniformly from the emissive portion 64. In this configuration, the output emissions 44, 48, and 52 may be output uniformly from the level indicator 12.

In some embodiments, the emissive portion 64 may comprise a light filtering layer or materials. The light filtering layer may be incorporated as an outer portion of the emissive portion 64 relative the active light source 34. The light filtering layer may be configured to inhibit light energy (e.g. environmental light or sunlight) from entering the carrier layer 42 and may correspond to a polymeric material comprising a glazing or coating of one or more light absorbing or reflecting materials. In this way, the filtering layer may prevent the charge or activation of the luminescent materials of the first passive light source 38 and the second passive light source 40 by light energy originating from outside the indication device 10. The controller may be operable to control the illumination of the first passive light source 38 and the second passive light source 40 via the selective activation of the light generating devices of the active light source 34.

In some embodiments, the emissive portion 64 may be arranged as a strip or in segments and may include one or more luminescent materials to form the first passive light source 38 and the second passive light source 40. The luminescent materials may be applied or otherwise arranged on the emissive portion 64 or the carrier layer 42 or interspersed therein. The light producing devices of the active light source 34 may be configured to emit the excitation emission 41 into the carrier layer for exciting the luminescent materials disposed in the emissive portion 64. More specifically, light emitted from the excitation source may reach the emissive portion 64, where the excitation emission 41 may be converted to the second output emission 48 and/or the third output emission 52 by the one or more luminescent materials. The light sources of the active light source 34 may be disposed on a circuit board (e.g. a flexible circuit board) that is coupled a substrate. The substrate may be connected to the vehicle 14 to secure the indication device.

Though described in detail incorporating the luminescent materials, in some embodiments, the lighting system indication device may utilize various forms of light sources and may not incorporate the luminescent materials. For example, the light sources 34 may correspond to various forms of light sources. The light sources 34 may correspond to halogen lighting, fluorescent lighting, light emitting diodes (LEDs), red-green-blue (RGB) LEDs, organic LEDs (OLEDs), polymer LEDs (PLEDs), solid state lighting or any other form of lighting configured to generate light.

As discussed herein, the luminescent material(s) may be applied as a coating and/or dispersed in a material forming the surface or the carrier layer 42 of the level indicator 12. In an exemplary embodiment, the first passive light source 38 may be formed by a persistent luminescent material configured to charge in response to receiving the excitation emission 41. The second passive light source 40 may be formed of a transient luminescent material configured to convert the excitation emission 41 but not to hold a substantial charge. That is, transient luminescent materials may be utilized for the second passive light source 40 and configured to emit light in response to receiving the excitation emission 41 for only a short duration after the excitation emission 41 is deactivated. A short duration as may correspond to a period of time less than 5 minutes and may correspond to times less than 1 minute, 30 seconds, 10 seconds or less depending on the particular properties of the transient luminescent materials.

Each of the second output emission 48 and the third output emission 52 may correspond to luminescence light, which may be in the form of transient luminescence and/or persistent luminescence. As utilized herein, both transient luminescence and persistent luminescence may correspond to light emitted from a luminescent portion. Persistent luminescence may be distinguished from transient luminescence as described herein due to a continued emission of light or luminescence being emitted from a persistent luminescent material. As discussed herein, the first passive light source 38 may correspond to a persistent passive light source comprising persistent luminescent materials. For example, the first passive light source may be configured to emit the second output emission 48 for a significant period of time following the deactivation of the excitation emission 41. A significant period of time may correspond to a duration exceeding approximately 5 minutes, but may correspond to a period of time up to or exceeding 60 minutes.

In some embodiments, one or more of the output emissions 44, 48, and 52 may correspond to a plurality of wavelengths. The wavelength(s) corresponding to each of the output emissions 44, 48, and 52 may correspond to significantly different spectral color ranges. In this way, each of the output emission 44, 48, and 52 may be configured to emit light in the first color 46, the second color 50, and the third color 54. The plurality of wavelengths may be generated by a red-emitting luminescent material having a wavelength of approximately 620-750 nm, a green emitting luminescent material having a wavelength of approximately 526-606 nm, and a blue or blue green emitting luminescent material having a wavelength of approximately 400-525 nm.

The persistent luminescent materials as discussed herein may correspond to phosphorescent materials. Persistent luminescent materials may correspond to alkaline earth aluminates and silicates, for example doped (di)silicates. Such substances may incorporate persistent luminescent phosphors or other doped compounds. Persistent luminescent substances may be doped with one or more ions, which may correspond to rare earth elements, for example: $Eu^{2+}$, $Tb^{3+}$, $Dy^{3+}$, and $R^{3+}$. Persistent luminescent materials may be defined as being operable to carry a charge and discharge light for a period of several minutes. For example, persistent luminescent materials as described herein may have an afterglow decay time longer than several minutes. The decay time may be defined as the time between the end of the excitation and the moment when the light intensity of the luminescent material drops below a minimum visibility of 0.32 $mcd/m^2$. The minimum visibility is roughly 100 times the sensitivity of the dark-adapted human eye, which corresponds to a definition used in the safety signage and by various researchers of luminescent properties.

A persistent luminescent material as discussed herein may be operable to emit light at an intensity of 0.32 $mcd/m^2$ after a decay time of 10 minutes. In an exemplary embodiment, a persistent luminescent material may be operable to emit light at an intensity of 0.32 $mcd/m^2$ after a decay time of 30 minutes and in some embodiments for a period longer than 60 minutes. In an exemplary embodiment, a persistent luminescent material may have a luminance ratio of greater than or equal to 20% of a first intensity after 10 minutes of decay time relative to a second intensity after 30 minutes of decay time. Additionally, in some embodiments, a persistent luminescent material may have a luminance ratio of greater than or equal to 10% of a first intensity after 10 minutes of decay time relative to a second intensity after 60 minutes of decay time.

As discussed herein, persistent luminescent materials may be operable to store energy received from the excitation emission 41 or a corresponding wavelength of light. The stored energy may then be emitted from the persistent luminescent material for a wide range of times, some extending up to approximately 24 hours. Such materials, when utilized in the luminescent portions discussed herein make it possible to sustain light from the luminescent portions by periodically emitting the excitation emissions 41 from the active light source 34. The periodic emission of the excitation emissions 41 may provide for a substantially sustained charge of the persistent luminescent materials to provide for a consistent ambient illumination of the first passive light source 38.

The transient luminescent materials discussed herein may correspond to organic or inorganic fluorescent dyes configured to convert the excitation emission 41 to output emissions. For example, the transient luminescent materials may comprise a luminescent structure of rylenes, xanthenes, porphyrins, phthalocyanines, or other materials suited to a particular Stokes shift defined by an absorption range and an emission fluorescence. In some embodiments, the transient luminescent materials may be of at least one inorganic luminescent material selected from the group of phosphors. The inorganic luminescent material may more particularly be from the group of Ce-doped garnets, such as YAG:Ce. As such, each of the luminescent portions may be selectively activated by a wide range of wavelengths received from the excitation emission 41 configured to excite one or more luminescent materials to emit an output emission having a desired color.

Each of the luminescent materials may comprise one or more transient luminescent and/or persistent luminescent materials. The luminescent materials may be utilized in the indication device on various surfaces of the vehicle 14. Additional information regarding the construction of luminescent structures to be utilized in at least one luminescent portion is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

The light sources of the active light source 34 as described herein may correspond to various forms of light source or light generating device. For example, the light sources 34 may correspond to one or more light generating devices such as halogen lights, fluorescent lights, light emitting diodes (LEDs), organic LEDs (OLEDs), polymer LEDs (PLEDs), red-green-blue (RGB) LEDs, solid state lighting or any other form of lighting. As such, the light sources may be configured to emit a variety of wavelengths of light, some of which may correspond to the excitation emission 41.

Figure 3:
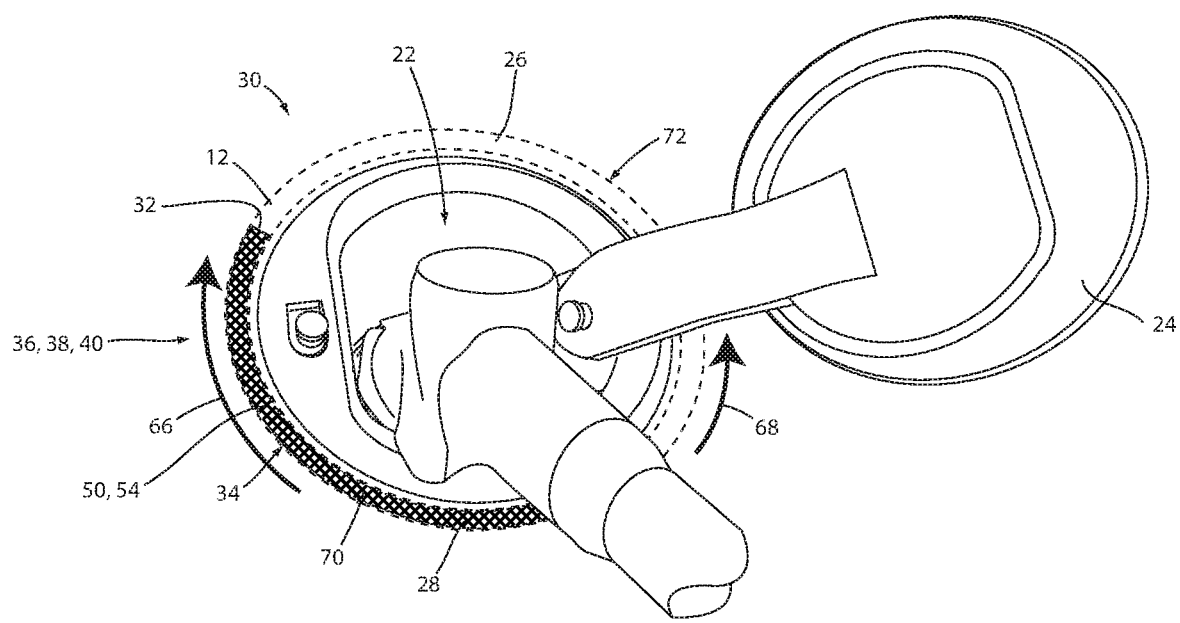
FIG. 3 is a detailed perspective view of a fuel port comprising a level indicator.

Referring now to FIG. 3, a detailed perspective view of the level indicator 12 is shown demonstrating a refueling or charging operation. During the charging operation, the level indicator 12 may selectively activate the excitation emission 41 from the active light source 34 to illuminate the first passive light source 38 and/or the second passive light source 40. In an exemplary embodiment, the first passive light source 38 and the second passive light source 40 may be illuminated in response to the excitation emission 41. As discussed previously, the first passive light source 38 may comprise persistent luminescent material, and the second passive light source 40 may comprise transient luminescent material. In this configuration, the persistent luminescent material of the first passive light source 38 may be charged by the excitation emission 41 while the vehicle 14 is refueling or charging.

The controller may selectively activate the active light source 34 to illuminate a portion of the level indicator 12 corresponding to a current charge of the vehicle 14 as denoted by a first arrow 66. During the charging operation, the excitation emission 41 may cause the first passive light source 38 to emit the second color 50 of light and the second passive light source 40 to emit the third color 54 of light. Consequently, the combination of the second color 50 and the third color 54 may blend to form a fourth color. In this way, the fourth color may be associated with the charging or refueling operation of the vehicle.

Once the charging operation is complete, the controller may deactivate the excitation emission 41 via the active light source 34. In response to the excitation emission 41 being deactivated, the second passive light source 40 may no longer output the third output emission 52 in the third color 54, but the first passive light source 38 may continue to emit the second output emission 48. In this way, a discharging operation of the first passive light source 38 may provide for the level indicator 12 to demonstrate a current charge level in the second color 50. As the vehicle is used, the first passive light source 38 may discharge in the direction of a second arrow 68 to communicate the discharge of the power source or fuel source of the vehicle 14. The first passive light source 38 may discharge in the direction of the second arrow 68 because the time for receiving the excitation emission 41 may be shorter for a second portion 72 of the level indicator 12 than for a first portion 70 of the level indicator 12. The second portion 72 may correspond to a portion of the level indicator 12 demonstrating a higher level of charge than the first portion 70.

The current charge level demonstrated by the level indicator 12 may also be controlled by selectively activating the excitation emission 41 periodically during the discharge of the power source or fuel source of the vehicle 14. Accordingly, the persistent luminescent material of the first passive light source 38 may be selected such that a discharge rate of the persistent luminescent material is greater than or equal to a discharge rate of the power source or fuel source of the vehicle 14. In this configuration, the controller may periodically activate the excitation emission 41 to charge the persistent luminescent material of the first passive light source 38 corresponding to a charge level of the vehicle 14.

During one or more periodic charges of the persistent luminescent material of the first passive light source 38, the controller may activate the first output emission 44 from the active light source 34 such that the level indicator 12 emits a fifth color of light. In such embodiments, the active light source may comprise one or more light sources configured to emit a plurality of colors of light (e.g. RGB LEDs). The fifth color of light may be similar to the second color 50 of the second output emission 48. In this way, the color of light emitted from the level indicator 12 may appear to correspond to the second color 50 when the controller is charging the first passive light source 38. The combination of the first output emission 44 and the second output emission 48 may provide for a combined output color from the level indicator to appear similar to a color of the second emission 48 while the vehicle is not being charged or refueled and a periodic charge is occurring.

In some embodiments, the indication device 10 may comprise one or more indicator light sensors configured to detect a level of charge and/or activated portion of the persistent luminescent material of the first passive light source 38. In this configuration, the controller may be configured to receive feedback from the indicator light sensors to identify a portion of the level indicator 12 illuminated by the first passive light source 38. In this way, the controller may periodically charge the persistent luminescent material of the first passive light source 38 to accurately represent the charge level of the vehicle 14 with the level indicator 12.

In some embodiments, the active light source 34 may be selectively activated by the controller to emit the first output emission 44 in the first color 46 in response to one or more states of the vehicle 14. For example, the controller may activate the active light source 34 to emit the first output emission 44 in response to the following vehicle states or events: a low fuel level indication, a door lock/unlock event, a fuel door open notification, an ignition state, a drive gear selection, or various other vehicle states or events. In this configuration, the indication device 10 may be configured to communicate a charge level of the vehicle 14 and may also be configured to communicate additional vehicle state or event information.

Figure 4:
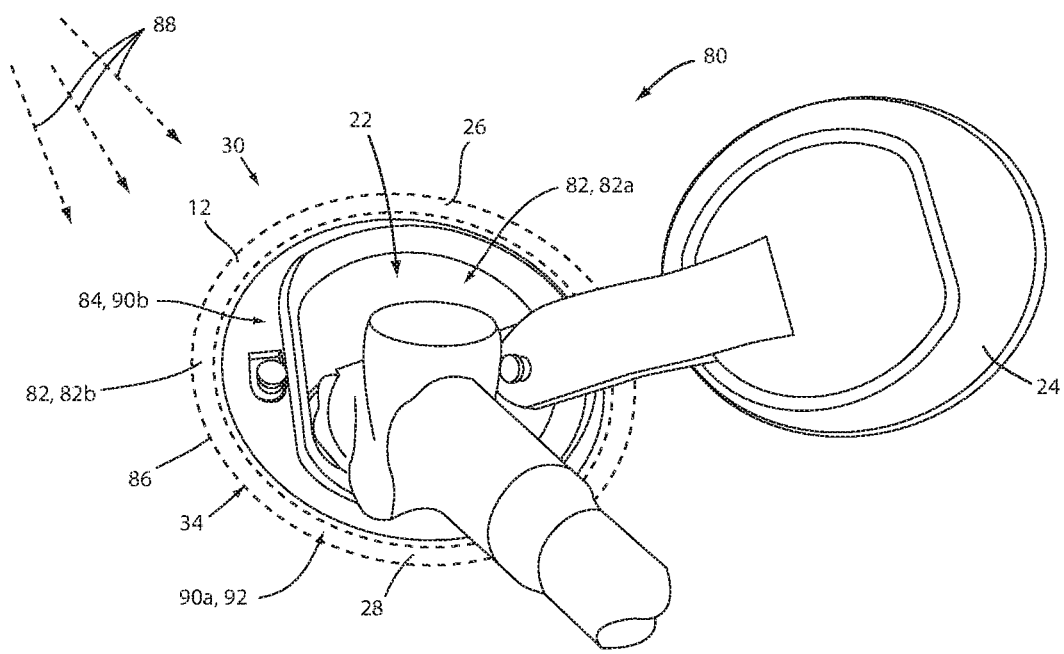
FIG. 4 is a perspective view of an illumination device for a vehicle fuel port.

Referring now to FIG. 4, a perspective view of an illumination device 80 configured to illuminate the fuel port 24 for the vehicle 14 is shown. The illumination device 80 may comprise similar elements and components as the indication device 10 discussed herein. Accordingly, similar reference numerals are used to describe similar elements. The illumination device 80 may comprise at least one luminescent portion 82. For example, the illumination device 80 may comprise a first luminescent portion 82a disposed in an interior cavity 84 of the fuel port 22. The illumination device 80 may further comprise the active light source 34 (e.g. an LED light source), which may be configured to selectively emit the excitation emission 41 to charge and illuminate the first luminescent portion 82a. The active light source 34 and the first luminescent portion 82 may be hidden in the interior cavity behind the fuel door 24 in FIG. 4, and are demonstrated in further detail in reference to FIGS. 5 and 6. As discussed herein, the illumination device 80 may be configured to illuminate the interior cavity 84 such that the fuel port 22 is visible during a refueling or recharging operation.

In some embodiments, the illumination device 80 may further comprise a second luminescent portion 82b disposed on or formed as a portion of a light transmissive panel 86. The second luminescent portion 82b may also be configured to receive the excitation emission 41 from the active light source 34. Additionally, the light transmissive panel 86 may be configured to transmit ambient light 88 from the environment surrounding the vehicle 14 and transmit the light into the interior cavity 84. The ambient light 88 may contain wavelengths of light similar to the excitation emission 41 and similarly charge the first luminescent portion 82a and the second luminescent portion 82b.

By transmitting the ambient light 88 through the light transmissive panel 86, the illumination device 80 may provide for the ambient light to reach the interior cavity 84 even when the fuel door 24 is closed. In this configuration, the light transmissive panel 86 may be configured to transmit the excitation emission 41 to charge the luminescent portions 82 in some conditions and may also be configured to transmit the ambient light 88 to the luminescent portions 82 in other conditions. The conditions in which the active light source 34 is activated to emit the excitation emission 41 may be identified by a controller in communication with the active light source 34. Accordingly, the disclosure provides for energy efficient operation of the illumination device 80, which may depend on an intensity of the ambient light 88, a vehicle status or condition, and various other factors.

Each of the luminescent portions 82 may comprise one or more persistent luminescent materials. As previously discussed, such materials may be may be operable to store energy received from the excitation emission 41 and may also be configured to store energy from the ambient light 88 transmitted through the light transmissive panel 86. The stored energy may then be emitted from the persistent luminescent material for a wide range of times, some extending up to approximately 24 hours. Utilizing the persistent luminescent materials in the luminescent portions 82 may provide for intermittent charging via the active light source 34 and/or the ambient light 88 to achieve sustained illumination of the interior cavity 84.

The light transmissive panel 86 may correspond to a ring-shaped insert disposed in an opening surrounding the fuel port 22 and the fuel door 24. The light transmissive panel 86 may be of a light transmissive material configured to transmit excitation wavelengths of the ambient light 88 to the luminescent portions 82. The light transmissive material may include a variety of optical polymers and in some embodiments may be of polycarbonate. The first luminescent portion 82a may be applied as a coating or integrated in a surface forming the interior cavity 84. The second luminescent portion 82b may be formed as an integral portion of the light transmissive panel 86 and/or may be applied as a coating to the light transmissive panel 86. In this configuration, the first luminescent portion 82a may be configured to emit a first output emission 90a illuminating the interior cavity 84, and the second luminescent portion 82b may be configured to emit a second output emission 90b illuminating an exterior surface 92 of the light transmissive panel 86. The output emissions 90 as well as the luminescent portions 82 are further discussed in reference to FIGS. 5 and 6.

Figure 5:
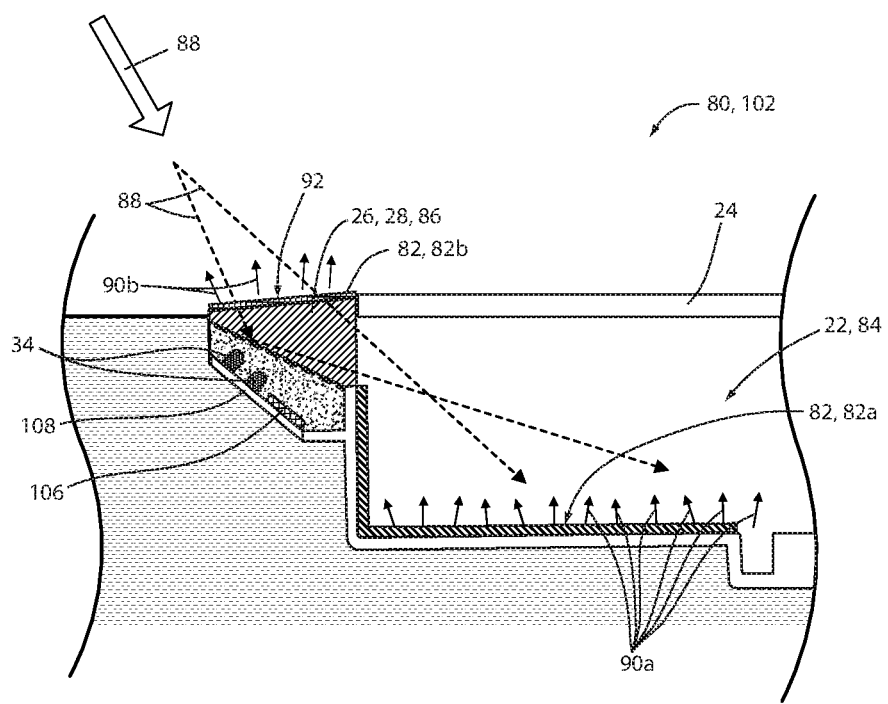
FIG. 5 is a partial side cross-sectional view of the passive illumination device of FIG. 4.
Figure 6:
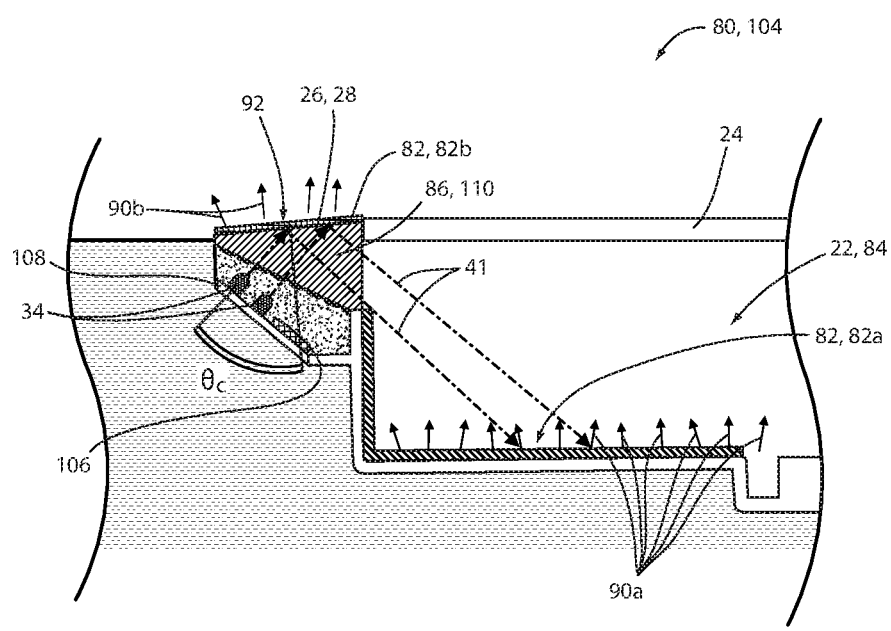
FIG. 6 is a partial side cross-sectional view of the passive illumination device of FIG. 4.

Referring now to FIGS. 5 and 6, partial side cross-sectional views of the illumination device 80 are shown demonstrating a passive charging configuration 102 and an active charging configuration 104, respectively. In the passive charging configuration 102, the ambient light 88 is transmitted through the light transmissive panel 86 into the interior cavity 84. In such conditions, it may be unnecessary for the active light source 34 to charge the luminescent portions 82. The illumination device 80 may comprise a light sensor 106 configured to detect a light intensity disposed within or proximate to the interior cavity 84. In some embodiments, the light sensor 106 may incorporated in a control circuit 108 of the active light source 34. In this configuration, a controller of the control circuit 108 may be operable to detect an intensity of the ambient light 88 with the light sensor 106 and selectively activate the active light source 34 in response to the light intensity ambient light 88 being less than a predetermined intensity or light threshold. The controller is further discussed in reference to FIG. 7.

Additionally, in some embodiments, the controller may further be configured to detect a charge level of the one or more of the luminescent portions 82. For example, the controller may monitor a signal from the light sensor 106 indicating the light intensity emitted from the luminescent portions 82 proximate to the interior cavity 84. That is, the controller may be operable to detect a first intensity of the first output emission 90a from the first luminescent portion 82a and may also be configured to detect a second intensity of a second output emission 90b from the second luminescent portion 82b. In response to the first or second intensity being less than a lighting intensity threshold, the controller may selectively activate the active light source 34 to charge the luminescent portions 82.

As discussed herein, the controller may detect a lighting intensity of the ambient light 88 and/or a charge level or emission intensity of the luminescent portions 82 via the light sensor 106. Based on the light intensity of the ambient light 88 or the output emissions 90, the controller may selectively activate the active light source 34 in response to the intensity being less than a predetermined threshold. The controller may further be operable to limit the operation of the active light source 34 to temporal periods during or within a predetermined time of a vehicle operation or occupancy. Accordingly, the disclosure provides for an energy efficient operation of the illumination device 80, which may depend on an intensity of the ambient light 88, an intensity of the output emissions 90, a vehicle status or condition, and various other factors.

In the charging configuration 104, the controller may activate the active light source 34 to emit the excitation emission 41. The excitation emission 41 may be emitted into the light transmissive panel 86 thereby supplying charging energy to the second luminescent portion 82b, which may be disposed on or formed as an integral portion of the light transmissive panel 86. Additionally, the excitation emission 41 may be transmitted through the light transmissive panel 86 to supply charging energy to the first luminescent portion 82a. In this configuration, the illumination device 80 may be configured to efficiently supply the charging energy of the excitation emission 41 to each of the luminescent portions 82 through the light transmissive panel 86.

In some embodiments, the light transmissive panel 86 may be formed to provide for a total internal reflective configuration 110 such that the excitation emission 41 is efficiently transmitted through the light transmissive material into the interior cavity 84. In this configuration, the excitation emission 41 may be reflected within the light transmissive panel 86 and delivered to the luminescent portions 82 rather than being transmitted outward through the exterior surface 92 of the light transmissive panel 86. In order to ensure that the total internal reflection configuration 110 is achieved, the excitation emission 41 may be directed into the light transmissive panel 86 at a critical angle as provided by equation (1).

$$n_i \sin \theta_c = n_t \sin 90 \qquad \text{(eq. 1)}$$

In equation 1, $n_i$ is the index of refraction of the light transmissive material of the light transmissive panel 86, $\theta_c$ is the critical angle, and $n_t$ is the index of refraction of atmospheric air or the medium adjacent to the light transmissive panel 86. Accordingly, the critical angle may be calculated based on the light transmissive material to ensure that the excitation emission 41 is efficiently delivered to each of the luminescent portions 82.

Figure 7:
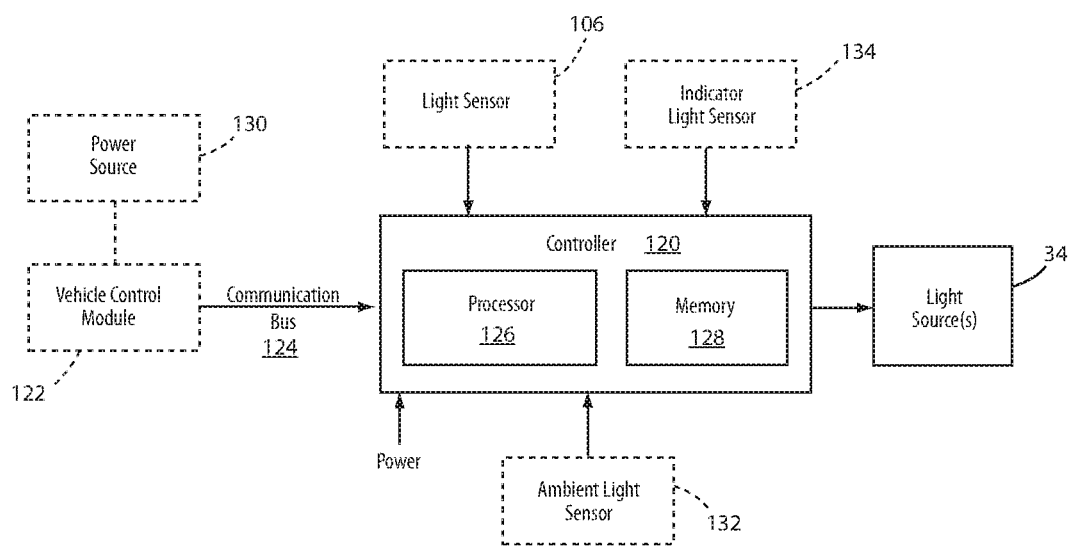
FIG. 7 is a block diagram of a controller configured to control an illumination apparatus in the form of a level indicator in accordance with the disclosure.

Referring to FIG. 7, a block diagram of a controller 120 configured to control the lighting device 10 and/or the illumination device 80 is shown. The controller 120 may be in communication with a vehicle control module 122 via a communication bus 124 of the vehicle 14. The communication bus 124 may be configured to deliver signals to the controller 120 identifying various states of the vehicle 14. For example, the communication bus 124 may be configured to communicate an operating condition of the vehicle 14 (e.g. the ignition is active), an ambient light level, a seat occupancy, a door ajar signal, a gear selection, a fuel level indication, a door lock/unlock event or any other information or control signals that may be communicated via the communication bus 124. In this way, the controller 120 may selectively activate the active light source 34 in response to one or more conditions communicated by the vehicle control module 122.

The controller 120 may include a processor 126 comprising one or more circuits configured to receive the signals from the communication bus 124 and output signals to control the light sources 34 and 36 discussed herein. The processor 126 may be in communication with a memory 128 configured to store instructions to control the activation of the light sources. The processor 126 may receive various signals and/or messages communicating vehicle conditions via the communication bus 124. In this way, the controller 120 may be configured to receive an indication of fuel level of a fuel source 130 of the vehicle 14.

The controller 120 may further be in communication with the light sensor 106, an ambient light sensor 132, and/or an indicator light sensor 134. Each of the sensors 106, 132, and 134 may be configured to communicate signals to the controller 120 such that the controller 120 may identify the level of ambient light 88 proximate the vehicle 14 and the illumination intensity of the first passive light source 38, respectively. Additionally, the sensors 106, 132, and 134 may be configured to detect a light level emitted from one or more of the luminescent portions 82 discussed herein. The light sensors 106, 132, and 134 may correspond to various forms of sensors, for example charge coupled devices CCDs, photodiodes, etc. Based on the inputs from the sensors 106, 132 and 134, as well as communications received via the communication bus 124, the controller 120 may selectively charge/activate each of the light sources 34 and 36 based on detections of light levels as well as various states of the vehicle 14.

The light sensors 106 and 132 may be operable to communicate a light condition, for example a level brightness or intensity of the ambient light 88 proximate the vehicle 14. Additionally, the indicator light sensor 134 may be operable to communicate an illumination level or portion illuminated of the level indicator 12 by the first passive light source 38. In response to the level of the ambient light and/or the illumination of the level indicator 12, the controller 120 may be configured to adjust a light intensity or excitation emission 41 output from the each of the light generating devices of the active light source 34. In this way, the intensity of the light output from the light sources 34 and 36 may be adjusted by controlling a duty cycle, current, or voltage supplied to the light generating devices of the active light sources 34.

In some embodiments, the controller 120 may further be configured to detect a charge level of the one or more of the luminescent portions 82. For example, the controller 120 may monitor a signal from the light sensor 106 indicating the light intensity proximate to the interior cavity 84 from the luminescent portions 82. That is, the controller 120 may be operable to detect a first intensity of the first output emission 90a from the first luminescent portion 82a and may also be configured to detect a second intensity of a second output emission 90b from the second luminescent portion 82b.

In this configuration, the controller 120 may detect a charge level or emission intensity of the luminescent portions 82 via the light sensor 106. Based on the emission intensity of the output emissions 90, the controller 120 may selectively activate the active light source 34 in response to the intensity being less than a predetermined emission threshold. The controller may further be operable to limit the operation of the active light source 34 to temporal periods during or within a predetermined time from a vehicle operation or occupancy. Such periods may be identified based on an ignition, occupancy (e.g. proximity detection, door access, etc.), or operation event communicated to the controller 120 via the communication bus 124.

According to one aspect of the present invention, an illumination device for a vehicle fuel port is disclosed. The illumination device comprises a light transmissive panel disposed around at least a portion of the fuel port and a first persistent luminescent portion disposed in an interior cavity of the fuel port. A light source is configured to emit a charging emission into the interior cavity. The light transmissive panel is configured to transmit ambient light from outside the interior cavity to the persistent luminescent layer.

Embodiments of the this aspect of the method can include any one or a combination of the following features:
- a fuel door configured to selectively enclose the interior cavity;
- wherein the charging emission is configured to charge the first persistent luminescent portion to emit a first output emission;
- wherein the first output emission illuminates the interior cavity and the fuel port;
- wherein the light transmissive panel comprises an internal reflective body configured to receive the excitation emission and emit the excitation emission into the interior cavity;
- a second persistent photoluminescent portion configured to emit a second output emission disposed in a portion of the light transmissive panel;
- wherein the light source is further configured to emit the charging emission into the light transmissive panel charging the second persistent photoluminescent portion; wherein the second persistent luminescent portion forms an indicator configured to illuminate an exterior surface of the light transmissive panel;
- a controller in communication with the light source, the controller configured to activate the light source to illuminate the indicator in response to one or more states of the vehicle;
- wherein the controller is configured to receive a fuel level signal of the vehicle and activate the light source in response to the fuel level signal indicating a fuel supply below a predetermined level;
- a controller configured to control an activation of the excitation emission;
- a light sensor in communication with the controller and configured to identify an illumination intensity of the first output emission; wherein the light sensor is disposed proximate to the interior cavity of the fuel port;
- wherein the controller is configured to selectively activate the excitation emission in response to the illumination intensity being less than a predetermined brightness; and
- wherein the light transmissive panel forms a ring extending substantially around the fuel port.

According to another aspect of the present invention, a method for illuminating a vehicle fuel port is disclosed. The method comprises receiving ambient light on an exterior surface of a light transmissive panel of the fuel port and transmitting the ambient light through the light transmissive panel into an interior cavity of the fuel port. The method further comprises charging a persistent luminescent portion disposed in the interior cavity with the ambient light and selectively emitting an excitation emission into the interior cavity charging the persistent luminescent portion.

Embodiments of the this aspect of the method can include any one or a combination of the following features:
- detecting with a light sensor a light intensity inside the interior cavity;
- wherein the excitation emission is selectively activated in response to the light intensity below a predetermined threshold; and
- selectively accessing the interior cavity via a fuel door configured to enclose the fuel port.

According to yet another aspect of the present invention, an illumination device for a vehicle fuel port is disclosed. The device comprises a light transmissive panel disposed around at least a portion of the fuel port and a first persistent luminescent portion disposed in an interior cavity of the fuel port. A fuel door is configured to selectively enclose the interior cavity and a light source is configured to emit a charging emission through the light transmissive panel into the interior cavity. The light transmissive panel is configured to transmit ambient light from outside the interior cavity to the persistent luminescent layer.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illumination device for a vehicle fuel port comprising:
   - a light transmissive panel disposed around at least a portion of the fuel port;
   - a first luminescent portion disposed in an interior cavity of the fuel port;
   - a second luminescent portion disposed in a portion of the light transmissive panel wherein the second luminescent portion forms an indicator configured to illuminate an exterior surface of the light transmissive panel;
   - a light filtering layer disposed on an outer portion of the light transmissive panel configured to prevent the charge, by ambient light, of at least one of the first luminescent portion and the second luminescent portion; and
   - a light source configured to emit a charging emission to at least one of the first luminescent portion and the second luminescent portion.

2. The illumination device according to claim 1, further comprising:
   - a fuel door configured to selectively enclose the interior cavity.

3. The illumination device according to claim 1, wherein the charging emission is configured to charge the first luminescent portion to emit a first output emission.

4. The illumination device according to claim 3, wherein the first output emission illuminates the interior cavity and the fuel port.

5. The illumination device according to claim 3, wherein the light transmissive panel comprises an internal reflective body configured to receive the charging emission and emit the charging emission into the interior cavity.

6. The illumination device according to claim 5, wherein the light source is further configured to emit the charging emission into the light transmissive panel charging the second luminescent portion.

7. The illumination device according to claim 1, further comprising:
a controller in communication with the light source, the controller configured to activate the light source to illuminate the indicator in response to one or more states of the vehicle.

8. The illumination device according to claim 7, wherein the controller is configured to receive a fuel level signal of the vehicle and activate the light source in response to the fuel level signal indicating a fuel supply below a predetermined level.

9. The illumination device according to claim 1, further comprising:
a controller configured to control an activation of the excitation emission.

10. The illumination device according to claim 9, further comprising:
a light sensor in communication with the controller and configured to identify an illumination intensity of the first output emission.

11. The illumination device according to claim 10, wherein the light sensor is disposed proximate to the interior cavity of the fuel port.

12. The illumination device according to claim 10, wherein the controller is configured to selectively activate the excitation emission in response to the illumination intensity being less than a predetermined brightness.

13. The illumination device according to claim 1, wherein the light transmissive panel forms a ring extending substantially around the fuel port.

14. A method for illuminating a vehicle fuel port comprising:
receiving ambient light on an exterior surface of a light transmissive panel of the fuel port wherein the light transmissive panel is configured to redirect the ambient light around a fuel door and into an interior cavity of the fuel port;
transmitting the ambient light through the light transmissive panel into an interior cavity of the fuel port;
charging a persistent luminescent portion disposed in the interior cavity with the ambient light; and
selectively emitting an excitation emission into the interior cavity charging the persistent luminescent portion.

15. The method according to claim 14, further comprising:
detecting with a light sensor a light intensity inside the interior cavity.

16. The method according to claim 14, wherein the excitation emission is selectively activated in response to the light intensity below a predetermined threshold.

17. The method according to claim 14, selectively accessing the interior cavity via a fuel door configured to enclose the fuel port.

18. An illumination device for a vehicle fuel port comprising:
a light transmissive panel disposed around at least a portion of the fuel port;
a first persistent luminescent portion disposed in an interior cavity of the fuel port;
a fuel door configured to selectively enclose the interior cavity; and
a light source configured to emit a charging emission through the light transmissive panel into the interior cavity, wherein the light transmissive panel is configured to transmit ambient light from outside the interior cavity to the persistent luminescent layer.

* * * * *